United States Patent [19]
Dunlap et al.

[11] Patent Number: 5,809,101
[45] Date of Patent: Sep. 15, 1998

[54] HANDLE UNIT FOR A FUEL ASSEMBLY IN A NUCLEAR REACTOR AND FUEL ASSEMBLY HAVING MODIFIED CHANNEL

[75] Inventors: Thomas G. Dunlap; Gerald M. Latter; Mark J. Colby; Michael R. Stepp, all of Wilmington, N.C.

[73] Assignee: General Electric Company, Schenectady, N.Y.

[21] Appl. No.: 655,875

[22] Filed: May 29, 1996

[51] Int. Cl.⁶ .................................................. G21C 3/32
[52] U.S. Cl. ........................................ 376/446; 376/444
[58] Field of Search .................................. 376/434, 444, 376/464, 448

[56] References Cited

U.S. PATENT DOCUMENTS

| | | | |
|---|---|---|---|
| 4,624,829 | 11/1986 | Jackson ..................................... | 376/434 |
| 4,749,543 | 6/1988 | Crowther et al. ........................ | 376/444 |
| 5,339,342 | 8/1994 | Meier et al. .............................. | 376/446 |
| 5,610,961 | 3/1997 | Dunlap et al. ........................... | 376/446 |
| 5,627,866 | 5/1997 | Dunlap et al. ........................... | 376/446 |

*Primary Examiner*—Daniel D. Wasil
*Attorney, Agent, or Firm*—Nixon & Vanderhye PC

[57] ABSTRACT

A fuel bundle assembly for a nuclear reactor includes a modified channel and a handle unit that improves pressure drop performance. With the modified channel, one approach is to vary the outside dimension of the fuel channel along the length of the channel, but maintain a constant channel wall thickness. Another approach is to maintain the external dimensions of the fuel channel and vary the wall thickness along the length of the channel. The handle unit is formed including a handle member and a separate rod support member releasably engageable with the handle member. The handle member includes channels for receiving latch pin assemblies, coolant rods and a spacer assembly. The rod support member includes a plurality of fuel rod support chambers providing lateral support for the fuel rods of the fuel assembly. The rod support member also includes a main chamber that is sized to receive a portion of the handle member in a friction fit. In addition to providing improved pressure drop performance, the arrangement eliminates the need to realign the fuel rods in an upper tie plate or an upper spacer when access to the fuel rods is necessary. In addition, the handle unit serves to prevent failed end plugs from escaping the fuel bundle.

27 Claims, 6 Drawing Sheets

HANDLE UNIT FOR A FUEL ASSEMBLY IN A NUCLEAR REACTOR AND FUEL ASSEMBLY HAVING MODIFIED CHANNEL

TECHNICAL FIELD

This invention relates generally to the structure of a fuel bundle assembly in a boiling water nuclear reactor vessel and, more particularly, to a fuel bundle assembly utilizing a new handle assembly in place of an upper tie plate, and a redesigned channel having an increasing flow volume in an axial direction.

BACKGROUND

A conventional fuel bundle assembly in a boiling water nuclear reactor includes a lower tie plate, an upper tie plate and a matrix of sealed fuel rods supported between the upper and lower tie plates. The fuel rods contain nuclear fuel pellets in sealed containment for supporting a required critical reaction for the generation of steam. One or more coolant rods is included in the matrix of the fuel rods and is also supported between the upper and lower tie plates. A channel surrounds the tie plates, fuel rods and one or more coolant rods. This channel is generally square in cross-section and made of metal (preferably Zircaloy). During reactor operation, coolant water enters through the lower tie plate within the channel and flows upwardly between the upstanding fuel rods. Water and generated steam exit through the upper tie plate. The channel confines the required moderator coolant flow to a flow path that is restricted between the tie plates.

A typical boiling water reactor channel has a constant internal flow area formed by a full length square cross section with rounded corners. Variations of the uniform thickness concept are disclosed in commonly owned U.S. Pat. No. 4,749,543. The patent discloses channel designs which have reduced average thickness in the upper portion of the channels corresponding to a lower pressure difference acting on the channel sides in the upper portion of the channel. In some instances, the axial variation of the channel average thickness increases water volume adjacent the upper part of the channel to provide increased neutron moderation, to minimize the steam void reactivity coefficient, and to provide a greater cold shut-down margin.

Energy addition along the fuel rods converts some of the water to lower density steam. The resultant steam-water flows, referred to as two-phase flows, have velocities that continue to increase upwardly in the fuel bundle as more steam is formed. Thus, if the flow area is maintained constant, much higher pressure drops occur in the upper section of the fuel bundle than in the lower section. Excess pressure drop in the fuel channels can limit the flow and power capability of the fuel.

Further, pressure drop in the two-phase flow region has an adverse effect on stability of plant operation. It is therefore particularly advantageous to increase flow area to reduce pressure drop in the upper section of a BWR fuel bundle. However, techniques for flow area increase must be compatible with both dimensional constraints and thermal performance of the fuel.

The outside dimensions of a fuel channel are highly constrained to assure that it will not affect or interfere with externally adjacent components such as control rods or instrument tubes. Fuel channels, however, are subject to creep bulging due to the pressure differentials that exist across the channel wall. Typically, the pressure differential across the channel wall is largest at the flow entrance and decreases as an approximate cosine function with downstream distance (the differential is zero at the channel exit). Therefore, the channel thickness required to resist creep bulging is also greatest at the flow entrance and decreases with downstream distance. Accordingly, any flow area increases which affect fuel channel wall thicknesses must consider these creep bulge characteristics.

Thermal performance of the fuel is limited by the maximum power for which normal boiling heat transfer can be maintained on all fuel rods. Beyond that power, referred to as the critical power, the heat transfer of one or more fuel rods can deteriorate causing unacceptable temperatures. For effective critical power performance, it is important to maintain good coolant distribution around all of the fuel rods. Since increasing the flow area of a fuel bundle can cause redistribution of the coolant flow, any such increases must therefore also consider potential associated effects on critical power performance.

As already mentioned, the lower tie plate and the upper tie plate serve to support the sealed fuel rods in the vertically oriented matrix, enclosed by the channel. Typically, the upper tie plate forms an overlying matrix of fuel rod support points. Into about eight of these support points (depending on the size of the fuel rod array) are placed male threaded tie rods and fittings. The tie rods, which may contain fuel similar to the fuel rods, are threaded at their lower ends for corresponding attachment to the lower tie plate. The lower tie plate similarly forms an underlying matrix of fuel rod support points, including threaded female apertures for supporting the lower threaded ends of the tie rods. Thus, the fuel rods are supported between the upper and lower tie plates, which in turn, are held together via the threaded tie rods.

As described in detail in co-pending application Ser. No. 08/542,382, filed Oct. 12, 1995, , now U.S. Pat. No. 5,627,866, the upper tie plate 22 and handle assembly 32 can be removed from the bundle assembly so that one or all of the fuel rods and coolant rods can be removed from the channel.

In designing a nuclear fuel bundle assembly, a limiting constraint for very high exposure capabilities is the pressure built up in the fuel rods due to fission gas release. Also, the differential irradiation growth of the fuel rods and water rods becomes more significant at high exposures, requiring very long end plug extensions which are guided laterally by bosses in current upper tie plate designs. These long end plug extensions reduce the length available for the fuel rod plenum used to accommodate the fission gas release. The upper tie plate and upper end plug designs currently used require complex machining, and these components, as well as the expansion springs, are costly.

In co-pending, commonly owned application Ser. No. 08/567,152 filed Dec. 5, 1995, now U.S. Pat. No. 5,610,961 (and incorporated herein by reference), there is disclosed a fuel bundle assembly which eliminates the upper tie plate in favor of only a relatively small handle bar assembly. The handle assembly connects directly to the channel so that lifting loads are borne by the channel itself, eliminating the need for separate tie rods. By eliminating the upper tie plate grid, the fuel rods may be extended in length to a point that adequate clearance with the upper handle of the fuel bundle assembly and the fuel handling equipment is maintained. The upper end plugs may also be shortened to thereby allow for the further extension of the fuel rod plenum length. Elimination of the upper tie plate with its complex grid construction also reduces the flow restriction and pressure drop at the top of the bundle, and provides an opportunity to reduce the overall cost of fuel bundle assembly fabrication. An additional benefit is that some of the fuel rods can be removed from the bundle without having to remove any other structural members from the upper end of the bundle.

Because the upper tie plate grid is eliminated, the other non-structural fuel and water rods are free at their upper ends. Typically, with the upper tie plate removed, the uppermost (or an additional) spacer is located near the upper ends of the rods to provide lateral support. Very short upper end plugs may now be used, since they function only to seal the upper ends of the fuel rods, and thus, the plenum regions of the fuel rods may be extended.

The fuel bundle assembly having the upper tie plate grid eliminated and including a spacer located near the upper ends of the rods still suffers, however, from a large pressure drop in the two-phase flow region. As noted above, excess pressure drop in the fuel channel can limit the flow and power capability of the fuel, and pressure drop in the two-phase flow region has an adverse effect on stability of plant operation. Still further, because the fuel pellets in the fuel rods extend substantially along the length of the fuel rods to a point, for example, several inches below the fuel rod end plugs, the coolest regions of the fuel rods are generally at or near the end plugs. As a result, hydrogen in the reactor vessel tends to collect at or near the end plugs, which detrimentally embrittles the cladding, thereby making the end plugs susceptible to breakage. In this instance, it is desirable to prevent the end plugs from escaping the fuel bundle and affecting other external components.

DISCLOSURE OF THE INVENTION

It is therefore an object of the present invention to provide an improved fuel bundle assembly of the type where the upper tie plate has been eliminated. Specifically, this invention relates to an improved lifting handle assembly that includes structure for preventing failed end plugs from escaping the fuel bundle.

It is another object of the invention to provide a fuel bundle channel design which exhibits pressure drop improvement over the existing constant-area channel designs, which satisfies dimensional clearance requirements, creep bulge requirements and critical power performance.

In the exemplary embodiment described herein, an axially non-uniform channel is provided to improve pressure drop performance of the BWR fuel bundle. One approach is to vary the outside dimension of the fuel channel along the length of the channel, but maintain a consistent channel wall thickness. This approach can be used in some BWR plants, where external clearance is allowed. Another and more preferred approach is to maintain the external dimensions of the fuel channel and to vary the wall thickness along the length of the channel. This approach can be applied to all BWR plants without regard to external clearances.

In addition, the handle unit according to the invention includes a removable structure for preventing debris from escaping the fuel bundle assembly. The handle unit structure also serves to reduce the pressure drop in the two-phase flow region by axially spacing the removable structure from the handle unit per se.

Thus, in one aspect, the present invention provides a handle unit and a fuel assembly incorporating the handle unit, wherein the handle unit includes a handle member having at least one channel for receiving the coolant rod, and a fuel rod support member releasably engageable with the handle member. The fuel rod support member is adapted to laterally support all of the full length fuel rods of the fuel bundle assembly.

In another aspect, the present invention provides a fuel bundle assembly for a nuclear reactor including an array of fuel rods, a lower tie plate supporting the array of fuel rods, a lifting handle located above the fuel rods and including a horizontally oriented grid structure adapted to support upper ends of the fuel rods and to prevent debris from escaping the fuel bundle assembly, and a channel enclosing the array of fuel rods and extending substantially between the lower tie plate and the lifting handle, wherein the channel has an interior flow volume that increases in an upper section thereof.

BRIEF DESCRIPTION OF THE DRAWINGS

These and other aspects and advantages of the present invention will become apparent from the following detailed description of preferred embodiments when read in conjunction with the accompanying drawings, in which.

BEST MODE FOR CARRYING OUT THE INVENTION

Figure 1:
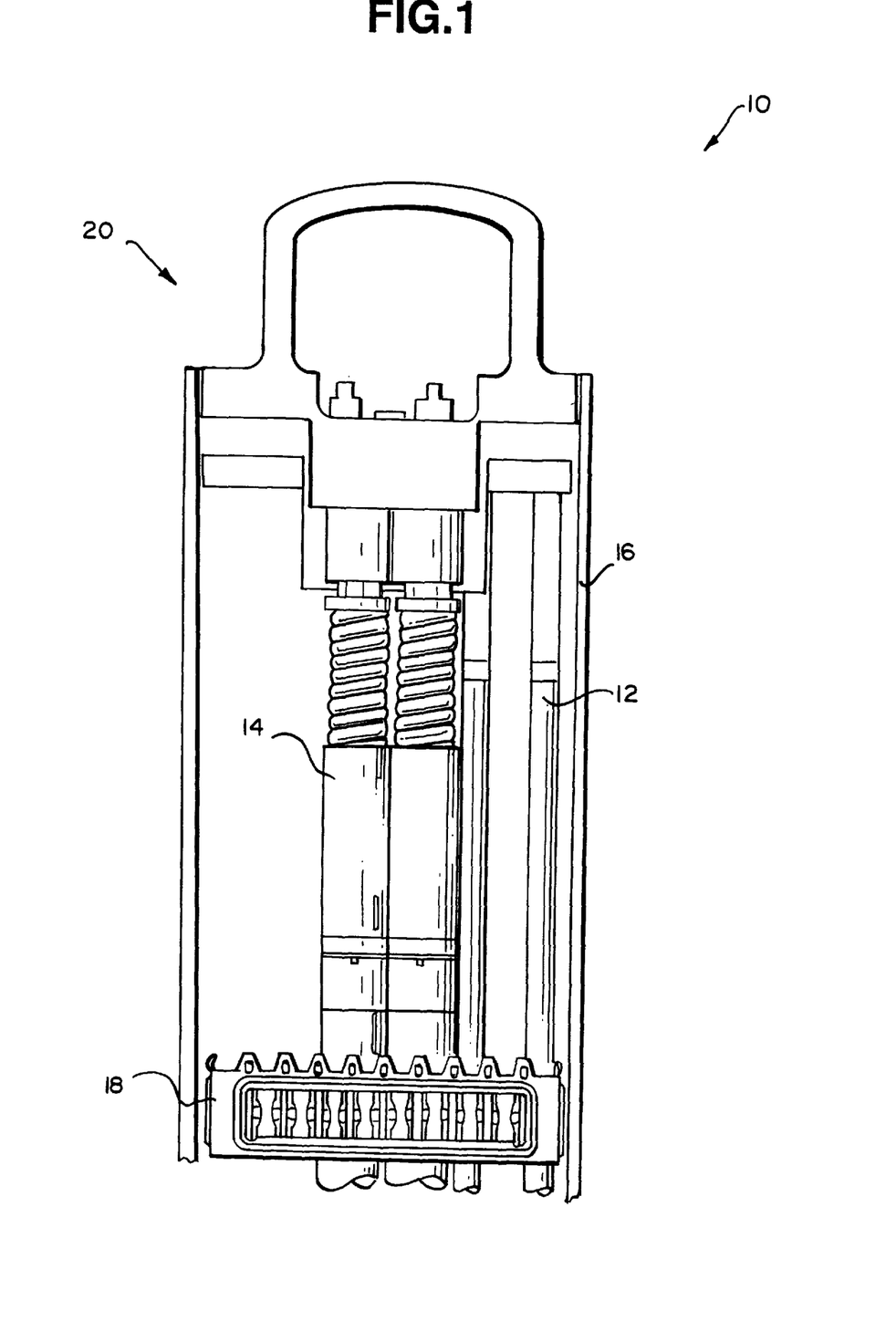
FIG. 1 is a front elevation view of the top portion of a fuel bundle assembly.

FIG. 1 is a cross-section of a fuel assembly for a boiling water nuclear reactor. The fuel assembly 10 includes a plurality of fuel rods 12, a pair of coolant rods 14 (two coolant rods 14 are illustrated and described in the preferred embodiment, however, a single coolant rod is often used in such fuel assemblies), and a channel 16 surrounding the fuel rods 12 and coolant rods 14. The fuel rods 12 are preferably arranged in a 10×10 matrix and are secured against lateral movement in the channel by a plurality of spacers 18. The coolant rods 14 are generally centrally disposed in the fuel rod matrix. Small holes are provided at both the lower and upper ends of the coolant rods 14 allowing water to be driven through the rod, thus introducing moderating material within the fuel rod matrix. One water rod also serves as the spacer-capture rod being mechanically locked to each of the spacers 18, thereby fixing the axial position of each spacer 18. The fuel rod spacers 18 are equipped with Inconel-X springs to maintain rod to rod spacing.

The fuel rods 12 and the coolant rods 14 are supported by a lower tie plate (not shown). In this embodiment, the conventional upper tie plate is eliminated in favor of the handle unit 20 according to the present invention (described below). The handle unit 20 is configured to receive the fuel rods 12 and the coolant rods 14 and restricts lateral movement.

Figure 2:
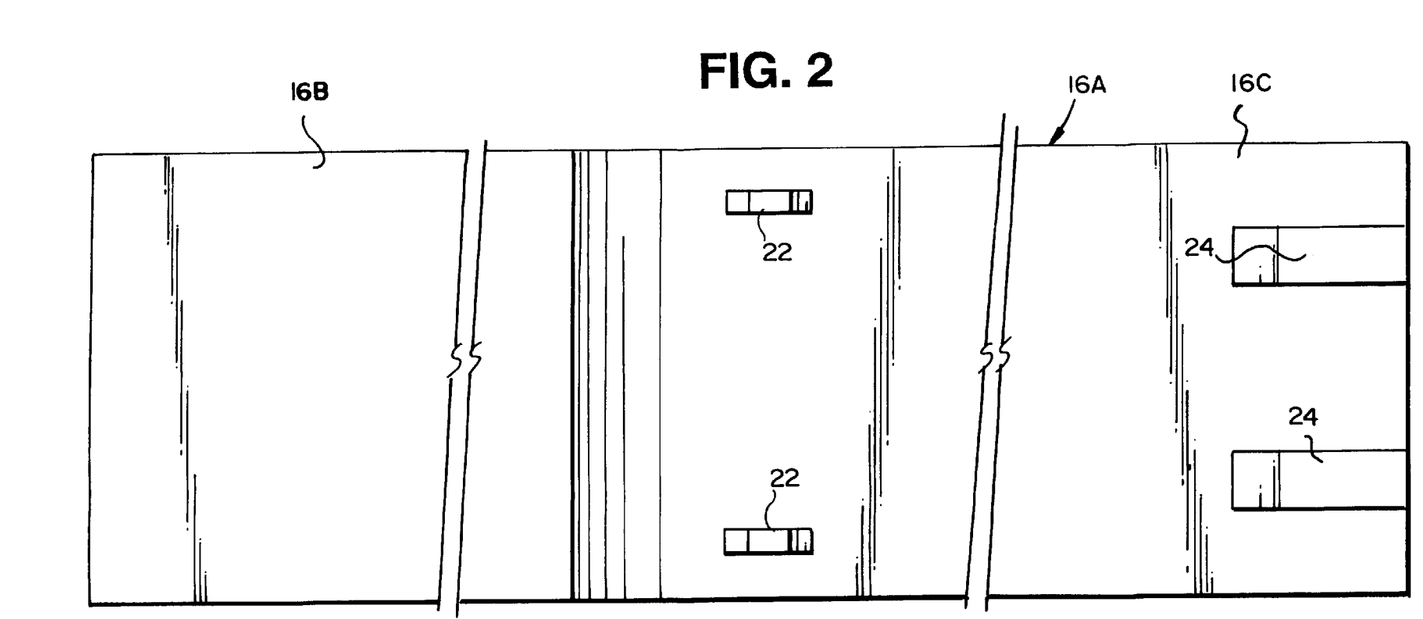
FIG. 2 is a partial plan view of a metal sheet used in the manufacture of a fuel bundle channel.
Figure 3:
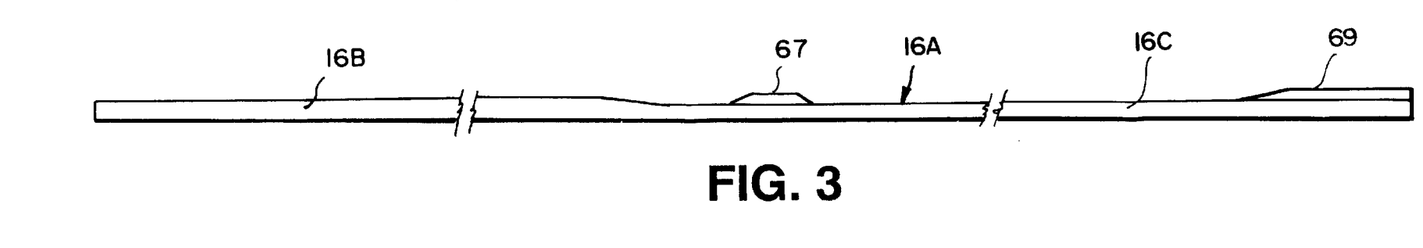
FIG. 3 is a front elevation of the strip shown in FIG. 2.

With reference now to FIGS. 2–10, improvements to the bundle assemblies in accordance with this invention are illustrated. In FIGS. 2 and 3, a channel strip 16A is illustrated prior to bending into a channel half which is ultimately welded to another, identical channel half to form a complete, substantially square section channel, similar to channel 16. With particular reference to FIGS. 2 and 3, it can be seen that the thickness of the channel strip 16A remains constant throughout the lower section 16B of the channel, extending, for example, from the lower edge of the channel to a location approximately 80 inches from the bottom edge of the channel, or about one half the channel length. At this point, the channel wall thickness tapers from a thickness of, for example, 0.075 inches to a thickness of, for example, 0.055 inches. Thus, the thickness reduction is about 25%, and the change in thickness occurs over an axial distance of about 1–2 inches. The reduced thickness is maintained through the upper section 16C of the channel to the uppermost edge thereof. It should be noted, however, that in this reduced thickness area, raised pads 22, 24 of the original channel wall thickness remain on the inside surface of the channel to hold the fuel rod spacers away from the channel wall. These pads allow a single spacer design to be used while still maintaining a relatively uniform gap around the periphery of the fuel bundle, as required for critical power performance. The pads 22, 24 illustrated in FIGS. 2 and 3 are shown at discrete locations along the channel, but they could also be formed as raised strips along most or all of the expanded section (i.e., reduced thickness section) of the channel to allow spacers to be positioned at arbitrary axial locations.

Figure 4:
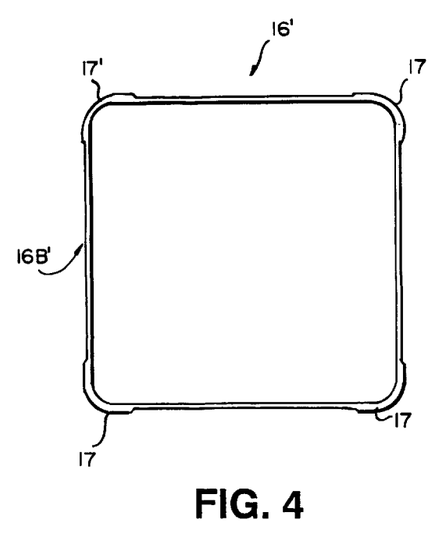
FIG. 4 is a cross-section through a lower end portion of a fuel bundle channel having thickened corners.
Figure 5:
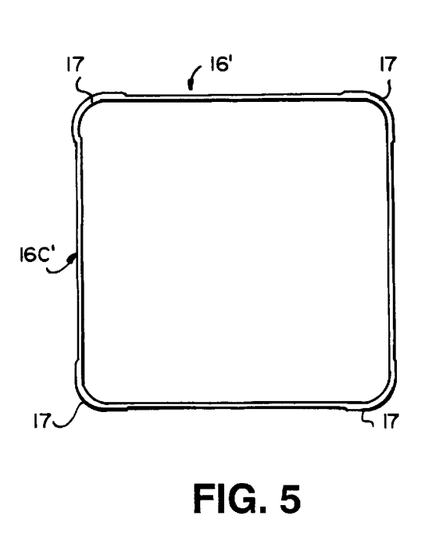
FIG. 5 is a cross-sectional view of an upper portion of the channel shown in FIG. 4, illustrating the reduction in wall thickness therebetween.
Figure 6:
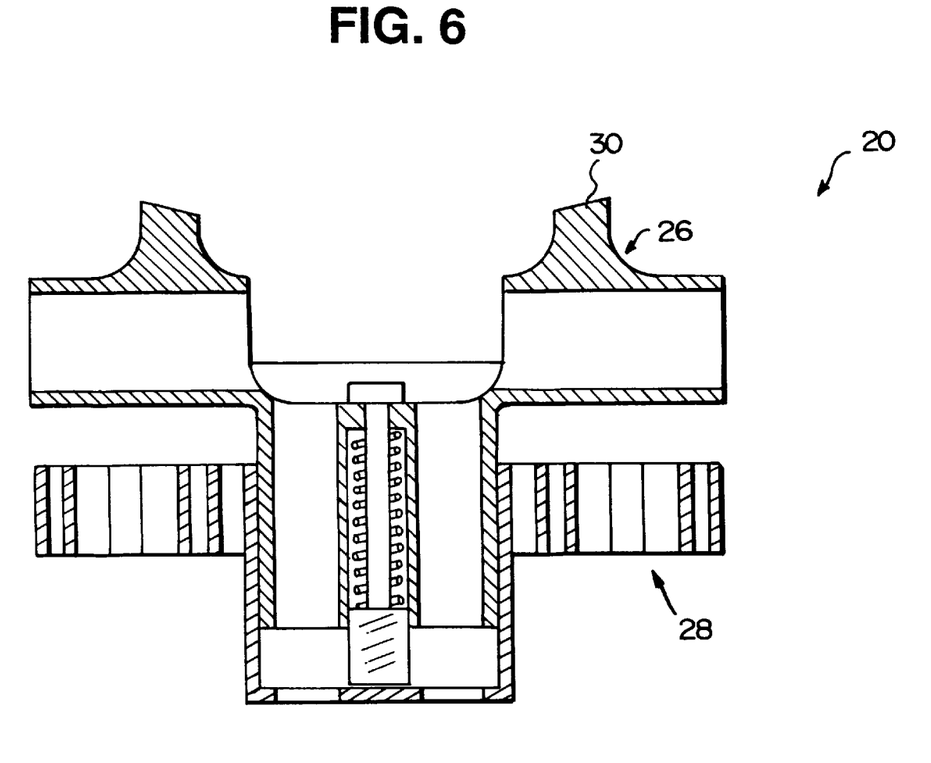
FIG. 6 illustrates an improved handle unit according to the present invention.
Figure 7:
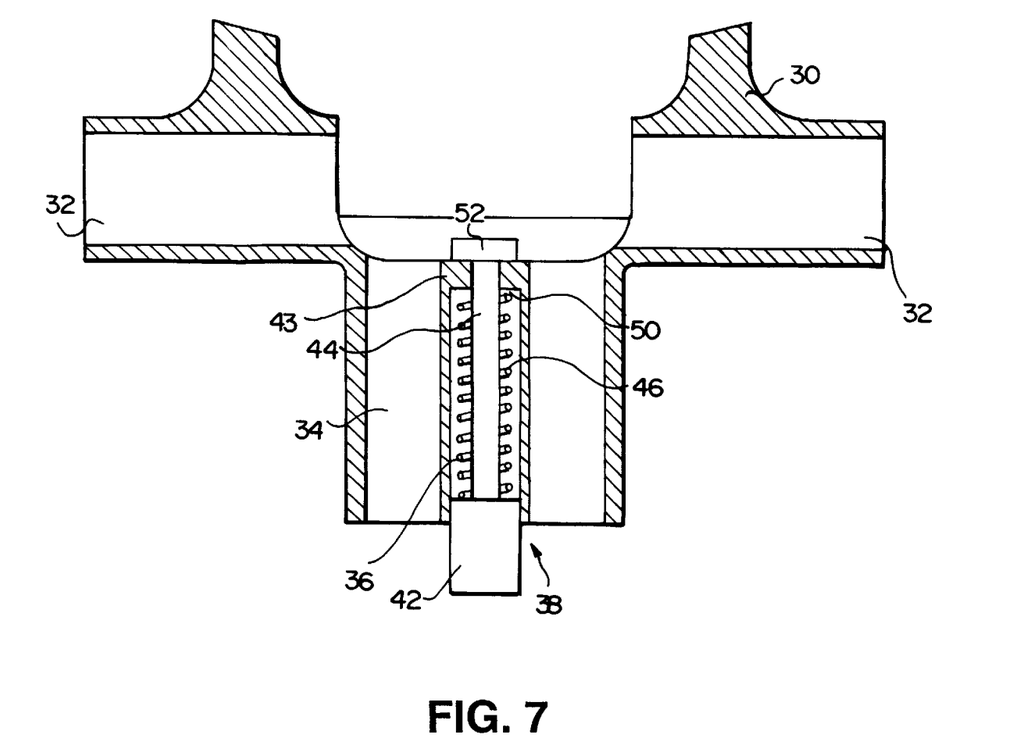
FIG. 7 is a cross sectional view of the handle member of the handle unit illustrated in FIG. 6.

The channel profile illustrated in FIGS. 2 and 3 is for a channel without thick corners. With reference now to FIGS. 4 and 5, end views of a channel 16' formed in accordance with this invention are illustrated, but with thickened corners 17 as found on certain channel designs. In FIG. 4, for example, the lower section 16B' of the illustrated channel has a wall thickness between the corners as stated above, i.e., 0.075 inches, while the corners have thicknesses of about 0.120 inches. In the upper section 16C' of the channel as illustrated in FIG. 5, the wall thickness between the corners 17 is also as stated above, i.e., 0.055 inches, while the corners themselves have a reduced thickness of 0.100 inches.

Again, the concept here is to use decreased channel wall thickness in order to increase the inside dimension of the channel in the upper section where the differential pressure across the channel wall is low. The creep bulge (which is proportional to the magnitude of the pressure differential and inversely proportional to a power of the channel thickness) can still be kept smaller than that which occurs in the lower region by judicious choice of the material thickness in the upper section. The larger flow area in the upper section is particularly effective for reducing pressure drop in the boiling two-phase region. The extra flow area in the upper section is specifically located about the periphery of the fuel, i.e., between the fuel rod array and the channel wall, which also results in significantly improved critical power performance.

FIGS. 6–10 illustrate a modified handle unit according to the invention. As noted above, the handle unit 20 according to the invention improves pressure drop performance, particularly in the two-phase flow region of the fuel bundle assembly. Moreover, as further noted above, because the end plugs are generally disposed at the coolest regions of the fuel rods, the end plugs are particularly susceptible to breakage by hydrogen collecting at the coolest regions of the fuel rods, which serves to detrimentally embrittle the cladding. In the event of such breakage, it is important to prevent the end plugs from escaping the fuel bundle, which may cause damage to other external components. Thus, the handle unit 20 of the invention includes a removable grid structure to prevent a failed end plug from escaping the fuel bundle.

Figure 8:
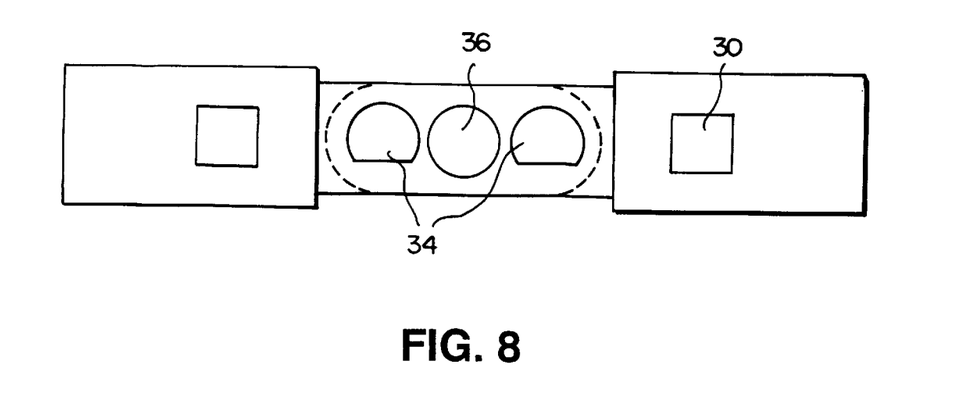
FIG. 8 is a top of the handle member of FIG. 7.

With reference to FIGS. 6–10, the handle unit 20 according to the present invention includes a handle member 26 and a rod support member 28 releasably engageable with the handle member. The handle member 26 is preferably integrally cast with a bail handle 30 forming a substantially T-shape. A pair of latch pin channels or bores 32 are provided in the cross-member of the T-shape and are sized to receive latch pin assemblies (not shown) for selectively engaging and disengaging the channel 16. Exemplary latch pin assemblies are disclosed in the above-noted commonly owned U.S. Pat. No. 5,610,961. The handle member 26 also includes a pair of coolant rod receiving holes 34 sized to receive coolant rods of the fuel bundle assembly and a spacer channel 36 that receives a spacer assembly 38. As shown in FIG. 8, the coolant rod receiving holes 34 are D-shaped corresponding to the shape of the fuel bundle assembly coolant rods. The D-shape serves to prevent the coolant rods from rotating.

The spacer assembly 38 spaces the handle member 20 and the rod support member 28 (described below), and includes a substantially cylindrical spacer cup 42 that is sized for a loose fit in the spacer channel 36. A spacer rod 44 is secured to the spacer cup 42 by any suitable means such as by welding or is formed integrally therewith and is surrounded in the spacer channel 36 by a spring 46. The spring 46 preferably extends into the spacer cup 42. A proximal end (uppermost end in FIG. 7) of the spacer channel 36 is provided with an annular shoulder 48 defining an aperture 50 therein that is smaller than the width of the spacer channel 36. The spacer rod 44 extends through the aperture 50 and includes structure for receiving a connecting member 52. In a preferred arrangement, the spacer rod 44 is threaded at its end extending through the aperture 50, and the connecting member 52 is a bolt that is threaded to the spacer rod 44.

Figure 9:
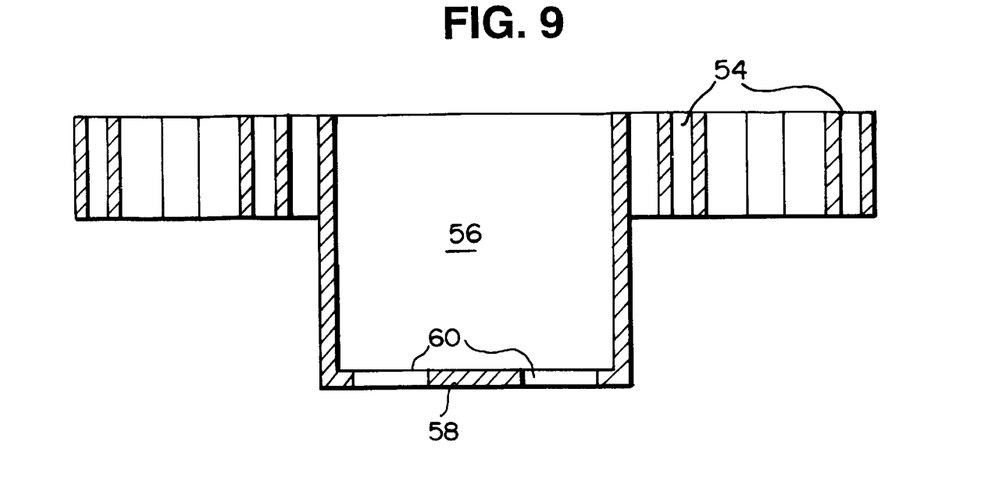
FIG. 9 is a cross sectional view of a fuel rod support member of the handle unit illustrated in FIG. 6.
Figure 10:
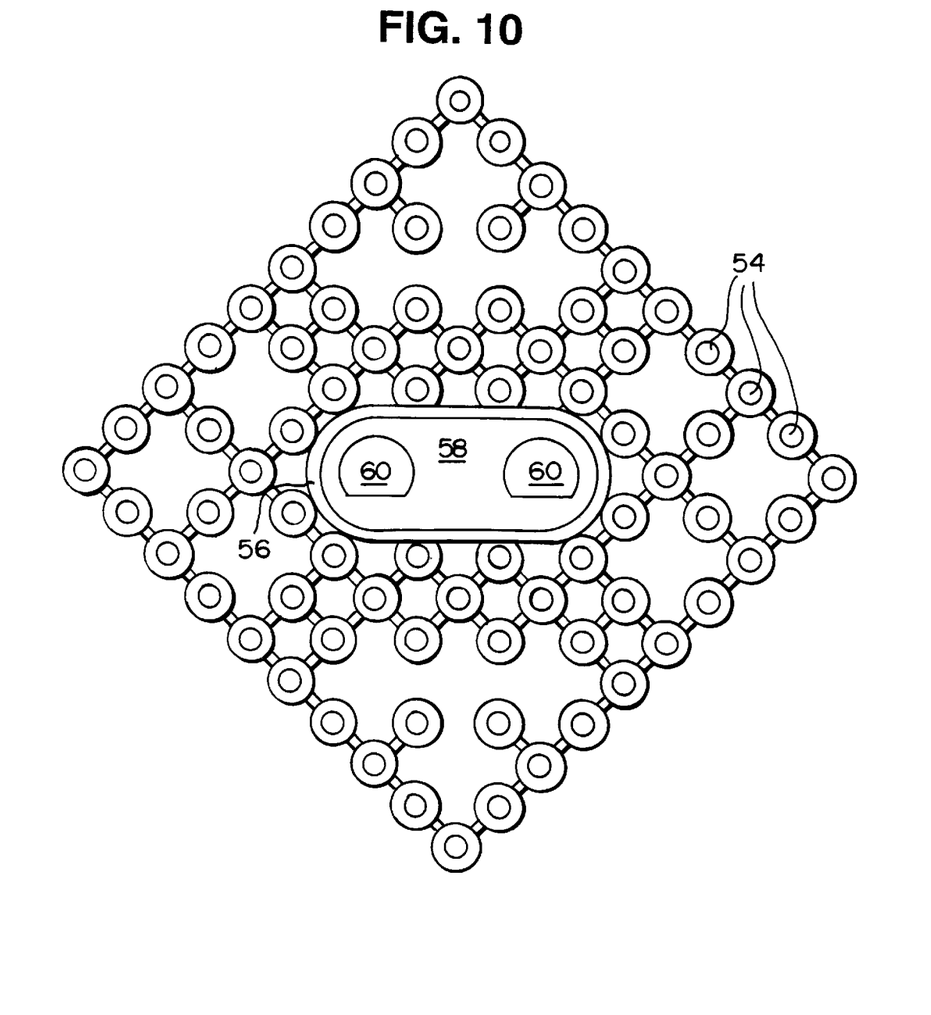
FIG. 10 is a top view of the fuel rod support member of FIG. 9.

FIGS. 9 and 10 illustrate the rod support member 28 according to the present invention. The rod support member 28 includes a plurality of fuel rod support chambers 54 that receive fuel rod end plugs and provide lateral support for the fuel rods. A main chamber 56 is centrally disposed in the rod support member 28 and is sized to receive the leg of the T-shape of the handle member 26 (see FIG. 6). A bottom 58 of the main chamber 56 supports the above-described spacer cup 42 and includes coolant rod apertures 60 shaped to receive the fuel assembly coolant rods.

The rod support member 28 is substantially T-shaped in cross-section, wherein the fuel rod support chambers 54 define the ends of the cross member of the T-shape, and the main chamber 56 defines the leg of the T-shape.

The handle member 26 and the rod support member 28 are preferably cast stainless steel. In operation, the rod support member 28 is mounted over the fuel rod end plugs and the coolant rods, and the bottom surface 58 of the main chamber 60 is rested against conventional coolant rod spring washers (see FIG. 1). The handle member 26 including the spacer assembly 38 is then inserted into the main chamber 56 of the rod support member 28 until the spacer cup 42 engages the bottom surface 58 of the main chamber 56. With this arrangement, the handle member 20 can be easily removed without requiring realigning of the fuel rods in an upper tie plate or an upper spacer. Moreover, the arrangement reduces the pressure drop in the two-phase flow region and prevents failed end plugs from escaping the fuel bundle.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A handle unit for a fuel assembly in a nuclear reactor, the handle unit comprising:

a handle member including a channel for receiving at least one coolant rod; and a rod support member releasably engageable with said channel, said rod support member adapted to laterally support fuel rods of the fuel assembly.

2. A handle unit according to claim 1, wherein said handle member comprises a bail handle and a latch pin channel for receiving a latch pin assembly.

3. A handle unit according to claim 1, wherein said handle member comprises a spacer channel receiving a spacer assembly, said spacer assembly spacing said handle member and said rod support member.

4. A handle unit according to claim 3, wherein said spacer assembly comprises:

a spacer cup disposed in said spacer channel and adapted to contact said rod support member;

a spacer rod having a first end disposed in said spacer cup and a second end extending through an aperture at a proximal end of said spacer channel;

a spring disposed surrounding said spacer rod; and a connecting member securable to said spacer rod second end.

5. A handle unit according to claim 4, wherein said spacer cup is substantially cylindrical, and wherein said spring extends into said spacer cup.

6. A handle unit according to claim 4, wherein said spacer rod second end is threaded, and wherein said connecting member is a bolt that is securable to said threaded second end.

7. A handle unit according to claim 1, wherein said rod support member comprises a plurality of fuel rod support chambers adapted to receive fuel rods of the fuel assembly.

8. A handle unit according to claim 7, wherein said support member comprises a centrally disposed main chamber having at least one aperture shaped to receive a coolant rod.

9. A handle unit according to claim 8, wherein said main chamber is sized to surround a portion of said handle member.

10. A handle unit according to claim 1, wherein said handle member is substantially T-shaped, including a latch pin channel disposed at opposing ends of a cross-member of the T-shape and at least one coolant rod channel disposed in a leg of the T-shape, and wherein said rod support member is substantially T-shaped, including a centrally disposed main chamber in a leg of the T-shape, said main chamber sized to fit over said at least one coolant rod channel.

11. A handle unit according to claim 10, wherein said handle member further comprises a spacer channel receiving a spacer assembly, said spacer channel being disposed in said leg of the handle member T-shape.

12. A fuel assembly comprising:

a plurality of fuel rods;

at least one coolant rod;

a fuel assembly channel surrounding said plurality of fuel rods and said coolant rod; and a handle unit disposed inside said fuel assembly channel and receiving said at least one coolant rod, said handle unit comprising a handle member including a channel for receiving said at least one coolant rod, and a fuel rod support member releasably engageable with said channel, wherein said fuel rod support member is adapted to laterally support said fuel rods.

13. A fuel assembly according to claim 12, wherein said handle member comprises a bail handle and a latch pin channel for receiving a latch pin assembly.

14. A fuel assembly according to claim 12, wherein said handle member comprises a spacer channel receiving a spacer assembly, said spacer assembly spacing said handle member and said rod support member.

15. A fuel assembly according to claim 14, wherein said spacer assembly comprises:

a spacer cup disposed in said spacer channel and adapted to contact said rod support member;

a spacer rod having a first end disposed in said spacer cup and a second end extending through an aperture at a proximal end of said spacer channel;

a spring disposed surrounding said spacer rod; and a connecting member securable to said spacer rod second end.

16. A fuel assembly according to claim 15, wherein said spacer cup is substantially cylindrical, and wherein said spring extends into said spacer cup.

17. A fuel assembly according to claim 15, wherein said spacer rod second end is threaded, and wherein said connecting member is a bolt that is securable to said threaded second end.

18. A fuel assembly according to claim 12, wherein said rod support member comprises a plurality of fuel rod support chambers receiving the plurality of fuel rods.

19. A fuel assembly according to claim 18, wherein said support member comprises a centrally disposed main chamber having at least one aperture shaped to receive a coolant rod.

20. A fuel assembly according to claim 19, wherein said main chamber is sized to surround a portion of said handle member.

21. A fuel assembly according to claim 12, wherein said handle member is substantially T-shaped, including a latch pin channel disposed at opposing ends of a cross-member of the T-shape and at least one coolant rod channel disposed in a leg of the T-shape, and wherein said rod support member is substantially T-shaped, including a centrally disposed main chamber in a leg of the T-shape, said main chamber sized to fit over the T-shape leg of the handle member.

22. A fuel assembly according to claim 21, wherein said handle member further comprises a spacer channel receiving a spacer assembly, said spacer channel being disposed in said leg of the handle member T-shape.

23. A fuel assembly according to claim 12, wherein said fuel assembly channel has an interior flow volume which increases in a direction from bottom to top.

24. A fuel assembly according to claim 12, wherein average wall thickness in an upper portion of said fuel assembly channel is less than in a lower portion of the channel.

25. A fuel assembly according to claim 24, wherein a wall thickness change separating said upper portion from said lower portion occurs about midway between upper and lower edges of said fuel assembly channel.

26. A fuel assembly according to claim 24, wherein spacer retaining tabs are provided in said upper portion, and wherein the thickness of said tabs is substantially equal to the channel wall thickness in said lower portion.

27. A fuel assembly according to claim 25, wherein said wall thickness in said upper portion is about 25% less than in said lower portion.

* * * * *